United States Patent
McGuire (10) Patent No.: US 8,486,269 B2
(45) Date of Patent: Jul. 16, 2013

(54) METHOD FOR GENERATING SOFTENED INJECTION WATER

(75) Inventor: Patrick Lee McGuire, Eagle River, AK (US)

(73) Assignee: BP Corporation North America Inc., Warrenville, IL (US)

( * ) Notice: Subject to any disclaimer, the term of this patent is extended or adjusted under 35 U.S.C. 154(b) by 505 days.

(21) Appl. No.: 12/736,380

(22) PCT Filed: Mar. 24, 2009

(86) PCT No.: PCT/US2009/001816
§ 371 (c)(1),
(2), (4) Date: Oct. 1, 2010

(87) PCT Pub. No.: WO2009/123683
PCT Pub. Date: Oct. 8, 2009

(65) Prior Publication Data
US 2011/0030967 A1    Feb. 10, 2011

Related U.S. Application Data

(60) Provisional application No. 61/064,937, filed on Apr. 3, 2008.

(51) Int. Cl.
*B01J 49/00* (2006.01)
(52) U.S. Cl.
USPC .................... 210/670; 210/672; 210/677
(58) Field of Classification Search
USPC .......................................... 210/670, 672, 677
See application file for complete search history.

(56) References Cited

U.S. PATENT DOCUMENTS

| 3,154,484 A | 10/1964 | Stoner |
| 3,494,881 A | 2/1970 | Ryan et al. |

(Continued)

FOREIGN PATENT DOCUMENTS

| EP | 0 225 793 A2 | 6/1987 |
| FR | 2 436 110 | 4/1980 |

(Continued)

OTHER PUBLICATIONS

Kroll, S., et al; "Practical Experience and Water Treatment Options Using Deep Aquifers for Steam Generatino in EOR Projects"; *11th Annual Heavy Oil & Oil Sands Technical Symposium*; The University of Calgary; Challenges and Innovations; pp. 1-25, Calgary, Can. Proc. (1994).

(Continued)

*Primary Examiner* — Chester Barry
(74) *Attorney, Agent, or Firm* — Nixon & Vanderhye (57) ABSTRACT

A method for generating softened injection water (A) (i) introducing source water having a dissolved solids content of up to 15,000 mg/liter and a multivalent cation content of greater than 40 mg/liter to a bed of cation exchange resin in monovalent cation form, (ii) passing the water through the bed so that at least a portion of the multivalent cations in the water are replaced by monovalent cations from the resin, and (iii) withdrawing the softened injection water having a multivalent cation content of up to 40 mg/liter; (B) regenerating the cation exchange resin by (i) introducing a regenerating brine to the vessel, (ii) passing the brine through the bed and (iii) withdrawing a brine containing displaced multivalent cations, wherein the brine is a naturally occurring high salinity water having a concentration of cations such that the Softening Limit for the source water is up to 40 mg/liter of multivalent cations.

38 Claims, 3 Drawing Sheets

U.S. PATENT DOCUMENTS

| | | | |
|---|---|---|---|
| 3,580,842 | A | 5/1971 | Higgins |
| 3,887,498 | A | 6/1975 | Kuhajek et al. |
| 3,951,802 | A | 4/1976 | Derouineau |
| 4,083,782 | A | 4/1978 | Kunin |
| 4,181,605 | A | 1/1980 | Braswell |
| 4,235,715 | A | 11/1980 | Wiegert |
| 4,238,325 | A | 12/1980 | Heskett |
| 4,332,678 | A | 6/1982 | Spiegl |
| 4,421,652 | A | 12/1983 | Heskett |
| 4,463,809 | A | 8/1984 | Tao |
| 4,839,086 | A | 6/1989 | Zaid |
| 5,166,220 | A | 11/1992 | McMahon |
| 6,926,835 | B2 | 8/2005 | Iizuka et al. |
| 2002/0179533 | A1 | 12/2002 | Chen |
| 2006/0169641 | A1 | 8/2006 | Duke et al. |

FOREIGN PATENT DOCUMENTS

| | | |
|---|---|---|
| WO | 2008/029124 | 3/2008 |
| WO | 2008/029131 | 3/2008 |
| WO | WO 2008/029124 A1 | 3/2008 |
| WO | WO 2008/029131 A1 | 3/2008 |

OTHER PUBLICATIONS

Lager, A., et al; "Low Salinity Oil Recovery—An Experimental Investigation"; *Society of Core Analysts International Symposium* (Trondheim, Norway) Proceedings Paper No. SCA 2006-36, pp. 1/12-12/12 (2006).

Wheeler, D.W.; "EOR project uses produced water"; *The Oil and Gas Journal*; vol. 77, No. 13, pp. 170, 172, 174, 176, (1979).

Stoyanov, et al; Neftepromyslovoe Delo, (*Oilfield Engineering*), No. 11, pp. 71-74 (Nov. 2005).

Shakhmarov; Izv Vyssh Ucheb Zavedenii, Neft Gaz No. 10; pp. 38-42 (Oct. 1986).

Reyes, R.B., "Softening of Oilfield produced Water by Ion Exchange for Alkaline Flooding and Steamflooding"; *Annual SPE California Regional Meeting*, Mar. 23, 1983-Mar. 25, 1983, vol. $53^{rd}$, Paper No. SPE-11706, pp. 1-10 (Mar. 23, 1983).

Brown, et al; "A New Ion Exchange Process for Softening High TDS Produced Water"; SPE/Petroleum Society of CIM/CHOA Paper No. 78941; Calgary, Alberta, Nov. 2002; *Petroleum Society Canadian Heavy Oil Association*; pp. 1-9.

Bradley; "Influence of Salt Dosage and Hardness on Series Softener Performance"; $42^{nd}$ Ann. SPE of AIME Fall Mtg. Oct. 1-4, 1967, Paper No. SPE—1951, 7 pgs.

McGuire, P.L., et al; "Low Salinity Oil Recovery: An Exciting New EOR Opportunity for Alaska's North Slope"; *Society of Petroleum Engineers, SPE Western Regional Meeting 2005*, vol. 2/2, SPE 93903, Apr. 1, 2005, pp. 1-15.

International Search Report for PCT/US2009/001816, mailed Sep. 28, 2009.

Reyes; "Softening of Oilfield Produced Water by Ion Exchange for Alkaline Flooding and Steamflooding", Annual SPE California Regional Meeting, Mar. 23, 1983-Mar. 25, 1983, vol. $53^{rd}$, No. Paper No. SPE-11706, Mar. 23, 1983, pp. 377-386, XP009122189.

P.L. McGuire et al., "Low Salinity Oil Recovery: An Exciting new EOR Opportunity for Alaska's North Slope", Society of Petroleum Engineers, SPE Western Regional Meeting 2005, vol. 2/2, SPE93903, Apr. 1, 2005, pp. 422-436, XP009092800.

FIG. 1

FIG. 3

METHOD FOR GENERATING SOFTENED INJECTION WATER

This application is the U.S. national phase of International Application No. PCT/US2009/001816, filed 24 Mar. 2009, which designated the U.S. and claims priority to U.S. Application No. 61/064,937, filed 3 Apr. 2008, the entire contents of each of which are hereby incorporated by reference.

This invention relates to the removal of multivalent cations, and in particular calcium and magnesium ions, from water that is to be injected into a hydrocarbon-bearing formation for enhanced recovery of hydrocarbon therefrom.

It has previously been found that by manipulating the total multivalent cation concentration of an injection water that the residual oil saturation of a formation (where crude oil and connate water are present within the pores of the formation) may be reduced in comparison to injecting the original injection water. In particular, it has previously been found that the recovery of crude oil from a reservoir comprising at least one porous and permeable hydrocarbon-bearing formation may be increased where the ratio of the total multivalent cation content of the injection water to the total multivalent cation content of the connate water is less than 1. This increase in recovery of crude oil is particularly noteworthy for hydrocarbon-bearing formations where the formation comprises sandstone rock and at least one mineral that has a negative zeta potential under the reservoir conditions. Accordingly, it is desirable to reduce the concentration of multivalent cations, in particular, the concentration of dications such as calcium or magnesium in an injection water, thereby providing a softened injection water, in particular, an injection water that contains less than 40 mg/litre multivalent cations (which may also be expressed as less than 120 mg/litre of calcium carbonate ($CaCO_3$) equivalents). This process is referred to herein as "softening" the injection water.

A known method of softening water, particularly for softening potable water or boiler feed water, involves the process of ion exchange. Ion exchange is a process whereby a water solution is passed through a bed of a material that replaces one kind of ion in solution with another kind of like charge. Such materials are known as ion exchange resins. Commercial and industrial water softeners generally contain cation-exchange resins for displacing one cation for another. These resins consist of insoluble macromolecular or polymeric substances to which negatively charged functional groups are covalently bound. The negative charges are counterbalanced by soluble monovalent cations, such as sodium cations. When hard water containing the multivalent cations, in particular, calcium or magnesium cations passes through the bed of the resin, the sodium cations that are ionically bound to the resin are replaced by the multivalent cations, calcium or magnesium ions, from the hard water. The reaction may be generalized as follows for calcium:

$$2Na.R + Ca^{2+} \rightarrow Ca.2R + 2Na^+(aq)$$

where R is an anionic functional group of the cation-exchange resin. The reaction for magnesium ($Mg^{2+}$) is similar to the reaction for calcium. Thus, the person skilled in the art would understand that the equilibrium constant for the resin when contacted with a water containing calcium cations (hardness ions) is:

$$K(mol/mol) = [Ca.2R \times (Na^+)^2]/[(Na.R)^2 \times Ca^{2+}]$$

Accordingly, excess sodium cations will drive the equilibrium to the left resulting in regeneration of the resin (converting the resin from the calcium form to the sodium form.

Thus, the treated water that has passed through the bed of cation exchange resin is softened owing to the sodium ions that are originally bound to the resin being exchanged for the multivalent cations (in particular, calcium and/or magnesium cations) in the source water. Once the resin has been substantially converted to a multivalent cation form (in particular, calcium and/or magnesium form), it can be regenerated by flushing the bed with a concentrated solution of sodium chloride to reverse the previous reaction.

To perform this process in commercial and industrial use, water softeners generally consist of a vessel filled with a bed of the cation exchange resin in its sodium form. In the service cycle, when the source water is being softened, the source water may enter at or near the top of the vessel and flows downwardly through the resin bed thereby becoming softened before exiting the vessel. Alternatively, the source water may enter at or near the bottom of the vessel and flows upwardly through the resin thereby becoming softened before exiting the vessel. Once the resin has been exhausted (substantially converted into its multivalent cation form), the resin must be regenerated. During regeneration, a concentrated brine (which is formed by dissolving sodium chloride in water) is passed through the resin bed in either the same direction as the service flow (co-current) or in the opposite direction to the service flow (counter-current).

Where it is desired to soften an injection water for use in an oil field that is located in an extreme climate (for example, arctic climate), it is impractical to handle the large amounts of sodium chloride that are required to regenerate the brine thereby rendering such water softening treatments uneconomic. It has now been found that certain aquifer brines may be used in place of high concentration sodium chloride solutions in the regeneration cycle.

Thus, the present invention provides a method for generating a softened injection water comprising:
(A) generating the softened injection water by (i) introducing a source water having a total dissolved solids content of up to 15,000 mg/litre and having a multivalent cation content of greater than 40 mg/litre to a vessel that contains a bed of a cation exchange resin in its monovalent cation form, (ii) passing the source water through the cation exchange resin bed so that at least a portion of the multivalent cations in the source water are replaced by monovalent cations from the cation exchange resin, and (iii) withdrawing from the vessel the softened injection water having a multivalent cation content of up to 40 mg/litre;
(B) regenerating the cation exchange resin by (i) introducing a regenerating brine to the vessel, (ii) passing the regenerating brine through the resin bed and (iii) withdrawing from the vessel a brine containing displaced multivalent cations, wherein the regenerating brine is a naturally occurring high salinity water having a concentration of monovalent cations and of multivalent cations such that the Softening Limit for the source water is up to 40 mg/litre of multivalent cations wherein the Softening Limit for the source water is defined as the Softening Ratio multiplied by the concentration of multivalent cations in the source water (mg/litre) and wherein the Softening Ratio is defined as:
(molar concentration of monovalent cations in the source water)$^2$/(molar concentration of multivalent cations in the source water):(molar concentration of monovalent cations in the regenerating brine)$^2$/(molar concentration of multivalent cations in the regenerating brine).

Typically, the vessel has a diameter of from 1 to 4 metres and a height of from 2 to 5 metres. Suitably, the height of the resin bed in the vessel is from 0.5 to 3 metres. Accordingly, the resin bed has a volume of from 0.2 to 38 m$^3$. Preferably, during the service cycle (when the source water is being softened), the source water is introduced to a plurality of vessels that are operated in parallel, each vessel containing a bed of cation exchange resin in its monovalent cation form, thereby ensuring continuous production of the softened injection water. Preferably, the source water is introduced to two or three vessels during the service cycle. Depending upon the time required to regenerate the resin, there may be periods when all of the vessels are in the service cycle. During the regeneration cycle (when the resin is being regenerated), the supply of source water to at least one of the vessels is interrupted. The regenerating brine is then introduced to the vessel(s) and is passed through the resin bed. It is preferred that at least one of the vessels remains in the service cycle when one or more of the vessels is in the regeneration cycle. Typically, the vessels enter the service cycle sequentially.

In the service cycle, the source water generally enters the vessel via an inlet positioned at or near the top of the vessel and is then passed downwardly through the resin bed thereby forming a softened injection water that is withdrawn from an outlet positioned at or near the bottom of the vessel. However, it is also envisaged that the source water may enter the vessel via an inlet positioned at or near the bottom of the vessel and is then passed upwardly through the resin bed thereby forming a softened injection water that is withdrawn from an outlet positioned at or near the top of the vessel. In the regeneration cycle, the flow of the regenerating brine is preferably countercurrent direction to the flow of the source water in the service cycle. Accordingly, the regenerating brine may enter the vessel through the outlet and the brine that contains the displaced multivalent cations is withdrawn from the inlet. However, it is also envisaged that the regenerating brine may be passed through the vessel in the same direction to the flow of source water in the service cycle (co-current flow) so that the regenerating brine enters the vessel via the inlet and is withdrawn from the vessel via the outlet. Accordingly, the vessel will be provided at the inlet and outlet with multi-way valves. Where the flow of regenerating brine in the regeneration cycle (regeneration step) is counter-current to the flow of source water in the service cycle, the multi-way valve at the inlet has a connection for a source water flow line and a connection for a disposal line (for the brine containing the displaced multivalent cations). Similarly, the multi-way valve at the outlet has a connection for a softened injection water flow line and a regenerating brine flow line. Where the flow of regenerating brine in the regeneration cycle is in the same direction as the flow of source water in the service cycle (co-current flow), the multi-way valve at the inlet has a connection for a source water flow line and a regenerating brine flow line. Similarly the multi-way valve at the outlet has a connection for a softened injection water flow line and a disposal line for the brine containing the displaced multivalent cations. It is also envisaged that the vessel may have dedicated inlets for the source water and the regenerating brine and dedicated outlets for the softened injection water and the brine containing the displaced multivalent cations.

The source water that is softened in the service cycle may be derived from a number of sources, for example, brackish water (for example, tidal or estuarine water), aquifer water, connate water, fresh water (having a relatively low total dissolved solids content of less than 500 ppmv), or produced water. Preferably, the source water is filtered to remove particulate matter, for example, using filtration media or cartridge filtration. Typically, the particulate matter that is removed in this optional filtration step has a particle size of greater than 10 microns. Where connate water or produced water (water that is separated from the oil that is produced from a production well) is used as the water source for the softened injection water, it is essential that residual oil is removed from the source water prior to contacting the connate water or production water with the cation-exchange resin as the oil. Suitable methods for removing trace amounts of oil from water are well known to the person skilled in the art and include filtration using media or ceramic filters, or centrifugation using hydrocyclones. If desired, mixtures of waters may be used as the source water.

Where the formation into which the softened water is to be injected contains swelling clays, the source water preferably has a total dissolved solids content (TDS) in the range of 8,000 to 15,000 ppmv, in particular, 8,000 to 12,000 ppmv. Thus, a relatively high TDS concentration is required in order to stabilize the swelling clays thereby avoiding the risk of formation damage.

Where the formation comprises insignificant amounts of swelling clays, the TDS of the source water is typically at least 200 mg/litre (ppmv), preferably at least 500 ppmv. Generally, the TDS of the source water may be up to 10,000 ppmv, preferably, up to 8,000 ppmv, more preferably, up to 7,000 ppmv. In particular, the TDS of the source water may be in the range of 500 to 10,000 ppmv, preferably 1,000 to 8,000 ppmv, for example, 1,000 to 5,000 ppmv.

Generally, the multivalent cations in the source water are divalent cations, in particular, $Ca^{2+}$, $Mg^{2+}$, $Ba^{2+}$, $Sr^{2+}$, $Cr^{2+}$ and $V^{2+}$, in particular, $Ca^{2+}$, and $Mg^{2+}$. However, the source water may also contain low amounts of trivalent cations such as $Cr^{3+}$ and $V^{3+}$. As discussed above, the source water contains at least 40 ppmv of multivalent cations. Typically, the source water contains at least 60 ppmv of multivalent cations, for example, at least 100 ppmv of multivalent cations or at least 150 ppmv of multivalent cations. Alternatively, where the hardness of the source water is expressed in $CaCO_3$ equivalents, typically the source water contains at least 120 ppmv $CaCO_3$ equivalents, for example, at least 200 ppmv of $CaCO_3$ equivalents, or at least 500 ppmv of $CaCO_3$ equivalents. However, the skilled person will understand that the values for hardness of the source water when expressed as $CaCO_3$ equivalents will vary depending upon the concentration of the various multivalent cations in the source water.

The Softening Limit (ppmv) for the source water is the lowest concentration of multivalent cations that can be achieved for the softened injection water using the selected source water and selected regenerating brine. The Softening Limit is determined by multiplying the Softening Ratio, determined for the selected source water and the selected regenerating brine, by the concentration of multivalent cations in the source water (mol/litre). The Softening Ratio is determined using the molar concentrations of monovalent cations and multivalent cations in the source water and the molar concentrations of monovalent cations and multivalent cations in the regenerating brine, as follows:

[source water monovalent cation]$^2$:[regenerating brine monovalent cation]$^2$

[source water multivalent cation] [regenerating brine multivalent cation]

Thus, the source water and regenerating brine are selected so that the concentration of multivalent cations in the softened injection water is 40 ppmv or less, preferably less than 35 ppmv, more preferably, less than 30 ppmv, for example, less than 25 ppmv. However, as there is no requirement to reduce the multivalent cation content of the softened injection water to the low values required for boiler feed water or potable water, a Softening Limit (ppmv) for the source water in the range of 5 to 40 ppmv, preferably, 10 to 40 ppmv is acceptable. However, through appropriate selection of the source water and regenerating brine, a lower Softening Limit may be achieved, for example, 2 ppmv or 3 ppmv. Where the hardness of the softened injection water is expressed in $CaCO_3$ equivalents, the source water and regenerating brine are selected so that the softened injection water has a hardness of 120 ppmv or less, preferably less than 100 ppmv, more preferably, less than 90 ppmv, for example, less than 80 ppmv of $CaCO_3$ equivalents.

Typically, the TDS of the softened injection water is marginally higher than the TDS of the source water owing to divalent cations in the source water displacing two monovalent cations from the cation exchange resin and trivalent cations in the source water displacing three monovalent cations from the cation exchange resin. Typically, the softened injection water contains 2 to 40 ppmv of multivalent cations, preferably, 5 to 40 ppmv of multivalent cations, for example, 10 to 40 ppmv of multivalent cations. Typically, the softened injection water has a content of calcium and/or magnesium cations of at least 2 ppmv, preferably, at least 5 ppmv, for example, at least 10 ppmv, provided that the total multivalent cation content of the softened injection water is at most 40 ppmv. Preferably, the fraction of the multivalent cation content of the softened injection water to the TDS of the softened injection water is less than $1 \times 10^{-2}$, such as $0.01-0.9 \times 10^{-2}$ preferably $0.1-0.8 \times 10^{-2}$.

The softened injection water may be used for enhanced recovery of oil from a porous and permeable formation of an oil reservoir wherein crude oil and connate water are present within the pores of the formation. Typically, the connate water that is present within the pores of the formation may have a wide range of TDS levels, such as 500 to 200,000 ppmv, for example, 2,000 to 50,000 ppmv.

Preferably, the formation that contains the crude oil and connate water comprises a sandstone rock and at least one mineral that has a negative zeta potential under the formation conditions. Zeta potential is a parameter well known in the art and may be measured by standard means known to the person skilled in the art. For example, zeta potential may be measured by forming a slurry of the mineral in an aqueous medium, passing an electric current through the slurry via electrodes and determining the direction and speed of the movement of the slurry particles. Preferably, the zeta potential of the mineral is from $-0.1$ to $-50$ mV, such as $-20$ to $-50$ mV under the reservoir conditions. By "reservoir conditions" is meant the temperature and pressure of the formation and the pH of the connate water. Typically, the temperature of the formation is in the range of 25 to 300° C., for example, 50 to 200° C., in particular 100 to 150° C. Typically, the pressure of the formation is in the range of 100 to 1000 bar. Generally, the connate water has a pH in the range 4 to 8, in particular, in the range 5 to 7. Typically, the formation comprises 1 to 50% by weight, preferably, 1 to 30% by weight, of the mineral(s) having a negative zeta potential under the reservoir conditions. The mineral may be a clay, in particular, clays of the smectite type (such as montmorillonite), pyrophillite type, kaolinite type, illite type and glauconite type. Preferably, the clay is non-swelling under the conditions of recovery of crude oil from the formation. Other examples of minerals that have a negative zeta potential under reservoir conditions include transition metal compounds, such as oxides and carbonates, for example, iron oxide, siderite, and plagioclase feldspars. The amount of such mineral(s) in the formation may be determined by X-ray diffraction using ground-up formation rock. It has been found that increasing levels of incremental oil recovery correlates with increasing amounts of the mineral(s) in the formation.

Typically, the ratio of the total multivalent cation content of the selected source water to the total multivalent cation of the connate water that is contained within the pores of the formation is greater than 1, for example, greater than 1.5 or greater than 2. Typically, the ratio of the total divalent cation content of the selected source water to the total divalent cation content of the connate water is also greater than 1, for example, greater than 1.5 or greater than 2. Preferably, following the softening treatment of step (A), the ratio of the total multivalent cation content of the softened injection water to the total multivalent cation content of the connate water is less than 1, for example, less than 0.9. Generally, the lower the ratio of the total multivalent cation content of the softened injection water to the total multivalent cation content of the connate water (hereinafter "multivalent cation ratio for the softened injection water"), the greater the amount of oil that is recovered from a particular formation. Thus, the multivalent cation ratio for the softened injection water is preferably less than 0.8, more preferably, less than 0.6, yet more preferably, less than 0.5, and especially less than 0.4 or less than 0.25. The multivalent cation ratio for the softened injection water may be at least 0.001, preferably, at least 0.01, most preferably, at least 0.05, in particular at least 0.1. Preferred ranges for the multivalent cation ratio for the softened injection water are 0.01 to 0.9, 0.05 to 0.8, but especially 0.05 to 0.6 or 0.1 to 0.5. The ratio of the total divalent cation content of the softened injection water to the total divalent cation content of the connate water is also preferably less than 1. The preferred values and ranges for the multivalent cation ratio for the softened injection water may be applied mutatis mutandis to the divalent cation ratio for the softened injection water.

The cation exchange resin of the resin bed is capable of chemically shifting between an active state, wherein the resin exchanges monovalent cations, in particular, sodium or potassium cations for multivalent cations (hardness ions), in particular, calcium and magnesium cations and an exhausted state, wherein multivalent cations (hardness ions) saturate the resin.

The cation exchange resin may be a bead-like or granular ion-exchange resin. The resin may be a macroreticular-type resin (also referred to as macroporous-type resin) or gel-type resin. Preferably, the cation-exchange resin is a strong acid cation exchange resin comprising a polymeric matrix having sulfonic acid active groups that are capable of ionically bonding to Group IA metal cations, in particular, sodium cations and of exchanging the Group IA metal cations for multivalent cations in the source water. Suitably, the polymeric matrix comprises a copolymer having a major portion of styrene and a minor portion of divinylbenzene that has been sulfonated resulting in the presence of sulfonic acid active groups therein. The cation exchange resins for use in the present invention are preferably in the sodium form. Preferred resins include those manufactured by Purolite including Purolite® SST resins (for example, Purolite® SST60 and Purolite® SST80 resins), the Purolite® C100 gel resins and Purolite® PPC150 macroporous resins. Other suitable resins are manufactured by The Dow Chemical Company including Dowex™ Marathon C and Dowex™ Marathon MSC and by Rohm & Haas including Amberjet™ 252 Na and Amberlite™ 200 C Na, which are macroporous-type resins, and Amberlite™ IR100 Na, Amberlite™ IR120 Na, and Amberjet™ 1200 Na, which are gel-type resins. Typically, the resins have a bead size in the range of from 0.5 to 1 mm, for example, 0.6 to 0.85 mm. The Purolite® SST resins, such as the SST60 and SST80, have fast kinetics because the cation exchange region is only on the surface of the bead, rather than throughout the sphere of the bead. Such resins are known in the industry as Shallow Shell or Shortened Diffusion Path (SDP) resins. It should be understood that the present invention contemplates the use of cation exchange resins having both standard and very fast kinetics.

Preferably, the regenerating brine is obtained from an aquifer and is fed to the vessel(s) that is in the regenerating cycle to displace the multivalent cations (hardness ions) absorbed by the resin. Typically, the regenerating brine is passed through the resin bed at a flow rate of at least 5 bed volumes per hour. The regeneration cycle is timed to allow the resin exposure to a specific volume of the regenerating brine, for example, 2 to 30 bed volumes, preferably, 5 to 20 bed volumes, in particular, 10 to 20 bed volumes of regenerating brine. After a specific amount of time has elapsed, therefore, the supply of the regenerating brine to the vessel is stopped. Typically, the volume of regenerating brine that is passed through the resin bed in the regenerating cycle is sufficient for the monovalent cations and multivalent cations absorbed on the resin to reach equilibrium with the monovalent cations and multivalent cations in the regenerating brine. In other words, the maximum resin regeneration capacity is achieved for the particular regenerating brine.

It is envisaged that the amount of monovalent cations in the regenerating brine will be sufficiently high (and the amount of multivalent cations be sufficiently low) that the regenerating brine will displace at least 50%, preferably, at least 70%, more preferably, at least 80%, for example, at least 90% of the multivalent cations (hardness ions) from the exhausted resin. Typically, the regenerating brine has a total dissolved solids content (TDS) of at least 10,000 ppmv, preferably, at least 15,000, more preferably, at least 17,500, in particular, at least 20,000 ppmv. Typically, the monovalent cation content of the regenerating brine is at least 5,000 ppmv, preferably, at least 7,000 ppmv, in particular, at least 9,000 ppmv. Typically, the multivalent cation content of the regenerating brine is less than 500 ppmv, preferably, less than 250 ppmv, in particular, less than 200 ppmv, for example, less than 150 ppmv. Preferably, the divalent cation content of the regenerating brine is less than 250 ppmv, preferably, less than 200 ppmv, for example, less than 150 ppmv. Optionally, salt (sodium chloride) may be added to the regenerating brine to adjust the monovalent cation content of the regenerating brine.

Suitably, the cation exchange resin beds may be periodically contacted with a synthetic brine regenerating solution (for example, a saturated sodium chloride solution), in order to supplement the regeneration step of the present invention thereby ensuring that the resin is fully converted back into its monovalent cation form. However, with appropriate selection of the regenerating brine and source water, this step may be omitted.

In certain applications, the method may further include a pH reduction step whereby the pH of the regenerating brine is reduced by addition of acid such as hydrochloric, citric or sulfamic acid. This step may be used following the step of regeneration with the regenerating brine to aid removal of insoluble precipitates that may form on the resin during contact with the source water/regenerating brine.

The brine that contains the displaced multivalent cations that exits the vessel(s) in the regenerating cycle may be passed to a brine disposal means. The brine disposal means may be a disposal well that injects the brine into an aquifer that is hydraulically isolated from the hydrocarbon-bearing formation of the oil reservoir. Alternatively, the brine that contains the displaced multivalent cations may be diluted into the produced water that is separated from the produced hydrocarbon at a production facility or may be diluted into a produced multiphase fluid comprising produced water, and produced liquid hydrocarbon, for example, upstream of an oil-water separator of the production facility.

In a further embodiment of the present invention there is provided a method of increasing the recovery of crude oil from a reservoir comprising at least one porous and permeable subterranean formation wherein the formation comprises sandstone rock and at least one mineral that has a negative zeta potential under the reservoir conditions and wherein crude oil and connate water are present within the pores of the formation, the method comprising:

(A) generating a softened injection water having a multivalent cation content of up to 40 mg/litre by (i) introducing a source water having a total dissolved solids content of less than 15,000 mg/litre and having a multivalent cation content of greater than 40 mg/litre to a vessel that contains a bed of a cation exchange resin in its monovalent cation form so that at least a portion of the multivalent cations in the source water are replaced by monovalent cations from the cation exchange resin, (ii) passing the source water through the cation exchange resin bed, and (iii) withdrawing from the vessel the softened injection water;

(B) injecting the softened injection water formed in step (A) into the formation thereby displacing crude oil from the surface of the pores of the formation;

(C) regenerating the cation exchange resin by (i) introducing a regenerating brine to the vessel, (ii) passing the regenerating brine through the resin bed and (iii) withdrawing from the vessel a brine containing displaced multivalent cations, wherein the regenerating brine is a naturally occurring high salinity water having a concentration of monovalent cations and of multivalent cations such that the Softening Limit for the source water is less than 40 mg/litre of multivalent cations wherein the Softening Limit for the source water is defined as the ratio of $\{[\text{source water monovalent cation}]^2/[\text{source water multivalent cation}]\}$ (mol/mol) and $\{[\text{regenerating brine monovalent cation}]^2/[\text{regenerating brine multivalent cation}]\}$ (mol/mol) (hereinafter referred to as Softening Ratio) multiplied by the concentration of multivalent cations in the source water (mg/litre); and (D) passing the brine containing the displaced multivalent cations that is withdrawn from the vessel in step (C) to a brine disposal means.

Preferably, the softened injection water is generated continuously by having at least one softening vessel in the service cycle (softening step). Typically, the softened injection water may be injected continuously into the formation. However, it may be preferred to inject the softened injection water in one or more portions of controlled oil reservoir pore volume, PV, (hereinafter referred to as "slugs"). The term "pore volume" is used herein to mean the swept volume between an injection well and a production well and may be readily determined by methods known to the person skilled in the art. Such methods include modeling studies. However, the pore volume may also be determined by passing a displacement fluid having a tracer contained therein through the formation from the injection well to the production well. The swept volume is the volume swept by the displacement fluid averaged over all flow paths between the injection well and production well. This may be determined with reference to the first temporal moment of the tracer distribution in the produced displacement fluid, as would be well known to the person skilled in the art.

Generally, the pore volume (PV) of the slug of softened injection water is at least 0.2 PV, as a slug of lower pore volume tends to dissipate in the formation and may not result in appreciable incremental oil production. It has also been found that where the pore volume of the softened injection water is at least 0.3, preferably, at least 0.4, the slug tends to maintain its integrity within the formation (does not disperse within the formation) and therefore continues to sweep displaced oil towards a production well. Thus, the incremental oil recovery for a particular formation approaches a maximum value with a slug of at least 0.3 PV, preferably at least 0.4 PV, with little additional incremental oil recovery with higher pore volume slugs. Although, it is possible to continue to inject the softened injection water into a formation, typically, the pore volume of the slug of softened injection water is minimized since there may be limited injection capacity for the softened injection water owing to the need to dispose of produced water. Thus, the pore volume of the softened injection water is preferably less than 1, more preferably less than 0.9 PV, most preferably, less than 0.7 PV, in particular, less than 0.6 PV, for example, less than 0.5 PV. Typically, the slug of softened injection water has a pore volume in the range of 0.2 to 0.9, preferably 0.3 to 0.6, and especially 0.3 to 0.45.

After injection of a pore volume of the softened injection water that achieves the maximum incremental oil recovery (preferably, a slug of softened injection water having a pore volume of less than 1), a drive (or post-flush) water of higher multivalent cation content and/or higher TDS, usually both, may be injected into the formation (for example, seawater or a high salinity produced water). Thus, the drive fluid typically has a TDS of at least 20,000 ppm, for example, at least 25,000 ppm. Typically, the drive fluid has a multivalent cation content of at least 100 ppmv, preferably, at least 150 ppmv. Where the slug of softened injection water has a pore volume of less than 1, the post-flush water will ensure that the slug of softened injection water (and hence the released oil) is swept through the formation to the production well. In addition, the injection of the post-flush water may be required to maintain the pressure in the reservoir. Typically, the post-flush water has a greater PV than the slug of softened injection water.

It is envisaged that after injection of a pore volume of the softened injection water that achieved the maximum incremental oil recovery, that the softened injection water may be injection into a different hydrocarbon-bearing formation of the oil reservoir or into a hydrocarbon-bearing formation of a different oil reservoir.

In the method of the invention, the softened injection water is preferably injected under pressure, for example, of 10,000 to 100,000 kPa (100 to 1000 bar) into at least one injection well that is spaced from a production well, and passes directly into the oil-bearing formation from the injection well. The passage of the softened injection water forces the connate water and displaced oil ahead of it, and towards the production well from which the oil is recovered, initially with connate water and, after prolonged injection of the softened injection water, with a mixture of connate water and softened injection water and eventually possibly just with softened injection water.

The method of the invention is usually used with production wells having insufficient pressure in the formation to produce significant amounts of oil (after primary recovery). These production wells may in secondary recovery (which follows primary recovery) or tertiary recovery (which follows secondary recovery). The method of the invention is thus of particular value with mature production wells.

The person skilled in the art will understand that in secondary recovery, a fluid is injected into the formation from an injection well in order to maintain the pressure in the formation and to sweep oil towards a production well. An advantage of injecting the softened injection water into the formation during secondary recovery, is that the softened injection water has been treated so as to release additional oil from the surface of the pores of the formation (compared with injection of the source water). Accordingly, there may be a longer period of dry oil recovery from the production well thereby deferring water break-through. In addition, even after water break-through, there will be enhanced recovery of oil compared with injecting the untreated source water.

The person skilled in the art will understand that in tertiary recovery, injection of the original fluid is stopped and a different fluid is injected into the formation for enhanced oil recovery. Thus, the fluid that is injected into the formation during tertiary recovery is the softened injection water, and the fluid that has previously been injected into the formation during secondary recover may be a water having a higher multivalent cation content than the softened injection water (for example, untreated source water, seawater and/or a produced water). Thus, an advantage of injecting the softened injection water during tertiary recovery is that this results in enhanced oil recovery.

There may be one injection well and one production well, but preferably there may be more than injection well and more than one production well. There may be many different spatial relations between the injection wells and the production wells. Injection wells may be located around a production well. Alternatively the injection wells may be in two or more rows between each of which are located production wells. These configurations are termed "pattern flood", and the person skilled in the art will know how to operate the injection wells to achieve maximum oil recovery during the water flood treatment (secondary or tertiary recovery).

The present invention will now be illustrated with respect to the following Figures and Examples.

Figure 1:
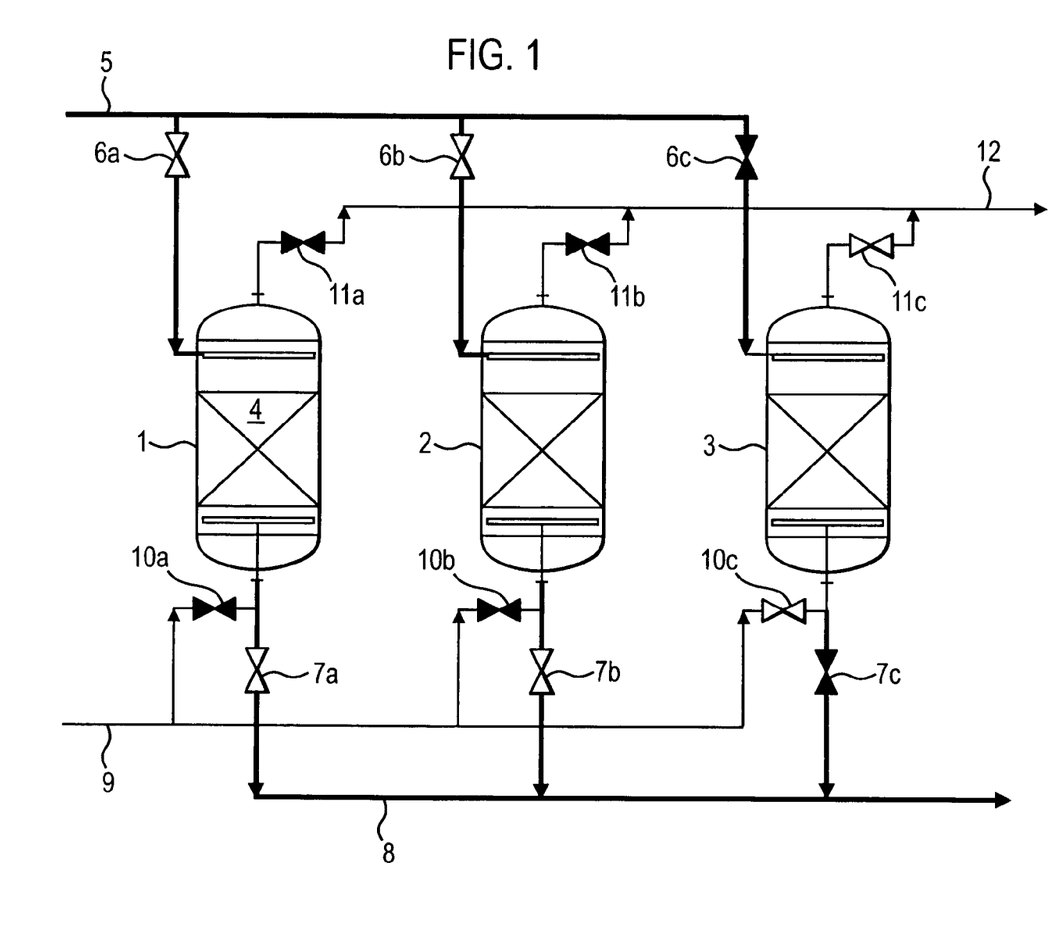

FIG. 1 is a schematic illustration of a system for use in the method of the present invention. The system comprises three vessels 1, 2, 3 each containing a bed 4 of cation exchange resin. The vessels 1, 2, 3 are connected to a source water supply line 5 via isolation valves 6a, 6b and 6c respectively, a regenerating brine (aquifer brine) supply line 9 via valves 10a, 10b, and 10c, a delivery line 8 for softened injection water via valves 7a, 7b and 7c respectively and a brine disposal line 12 via valves 11a, 11b and 11c. Vessels 1 and 2 are in the service cycle such that valves 10a, 11a, 10b, and 11b are closed while valves 6a, 7a, 6b and 7b are open. Accordingly, the source water is introduced into vessels 1 and 2 and is passed through the beds 4 of cation-exchange resin, where multivalent cations (hardness ions) are removed from the source water by cation exchange thereby generating softened injection water that is delivered to an injection well (not shown) via line 8. Vessel 3 is in the regeneration cycle such that valves 6c and 7c are closed and valves 10c and 11c are open. Accordingly, the regenerating brine is introduced into vessel 3 and passes through the resin bed in a counter-current direction to the flow of source water through vessels 1 and 2 that are in the service cycle. The monovalent cations in the regenerating brine displace at least a portion of the multivalent cations from the exhausted cation exchange resin thereby regenerating the resin. A brine containing the displaced multivalent cations is withdrawn from vessel 3 and is delivered to a disposal well (not shown) via brine disposal line 12.

EXAMPLES

A pilot study was carried out using 350 ml of Purolite® SST80 resin in a ¾" diameter column. The exhausted resin was fed with synthetic regenerating brine at a flow rate of 0.18 bed volumes/min (62 ml/min). The study was designed to achieve a total hardness (TH) leakage end point of less than 100 mg/litre $CaCO_3$ equivalents.

A summary of the runs are given in the Table below:

|  |  | Run 1 | Run 2 | Run 3 | Run 4 | Run 5 | Run 6 |
|---|---|---|---|---|---|---|---|
| Regenerating Brine |  |  |  |  |  |  |  |
| Salinity, % by weight |  | 10 | 2 | 2 | 2 | 2 | 2.25 |
| Volume, litres |  | 0.8 | 1.4 | 2 | 3 | 5.7 | 5.7 |
| NaCl, g |  | 80 | 28 | 40 | 60 | 114 | 128.5 |
| lb/ft$^3$ |  | 14.2 | 5.0 | 7.1 | 10.7 | 20.3 | 24.0 |
| NaHCO$_3$, g |  | 0 | 2.7 | 0 | 0 | 0 | 0 |
| CaCl$_2$, g |  | 0 | 0.66 | 0.66 | 0 | 0.8 | 2.4 |
| Tap water, ml |  | 0 | 0 | 2000 | 3000 | 5700 | 5700 |
| Deionised (DI) water, ml |  | 800 | 1400 | 0 | 0 | 0 | 0 |
| Analysis |  |  |  |  |  |  |  |
| Chloride, Cl$^-$ (mg/litre) |  | 60500 | 11700 | 12100 | 12300 | 12100 | 14000 |
| M Alkalinity (mg/litre or ppmv) |  | — | 1300 | 80 | 100 | 200 | 160 |
| Total milli-equivalents/ml (meq/ml) |  | 3.91 | 1.37 | 1.96 | 2.93 | 4.46 | 5.29 |
| Resin capacity | meq/ml | 1.83 | 1.83 | 1.83 | 1.83 | 1.83 | 1.83 |
| Regeneration % | meq/ml | 214 | 75 | 107 | 160 | 244 | 289 |
| Run data |  |  |  |  |  |  |  |
| TH Leakage, % |  | <1 | 20 | 27 | 20 | 9 | 8 |
| Average TH, mg/litre or ppmv | as CaCO$_3$ equivalents | <2 | 140 | 232 | 160 | 75 | 65 |
|  | as M$^{2+}$ (based on 70:30 split of Ca$^{2+}$ to Mg$^{2+}$) | <2 | 47 | 77 | 53 | 25 | 22 |

In Run 1 increasing the run flow rate up to 0.3 BVM did not produce any leakage.

Run 6 used 5.7 litres of a 2.25% salt solution containing hardness cations (Ca$^{2+}$). The unit rinsed down in less than 10 minutes, based on conductivity (i.e. one bed volume was passed through the column in 10 minutes). The hardness level was good after the next bed volume had passed through the column (72 mg/litre as CaCO$_3$ equivalents). The total hardness (TH) leakage was slightly better than for Run 5, 8% versus 9%, but this did not justify the increased salt dosage from 20.3 to 24.0 lbs/ft$^3$. The results show that a 2.0% salt solution would be effective to regenerate the resin.

Figure 2:
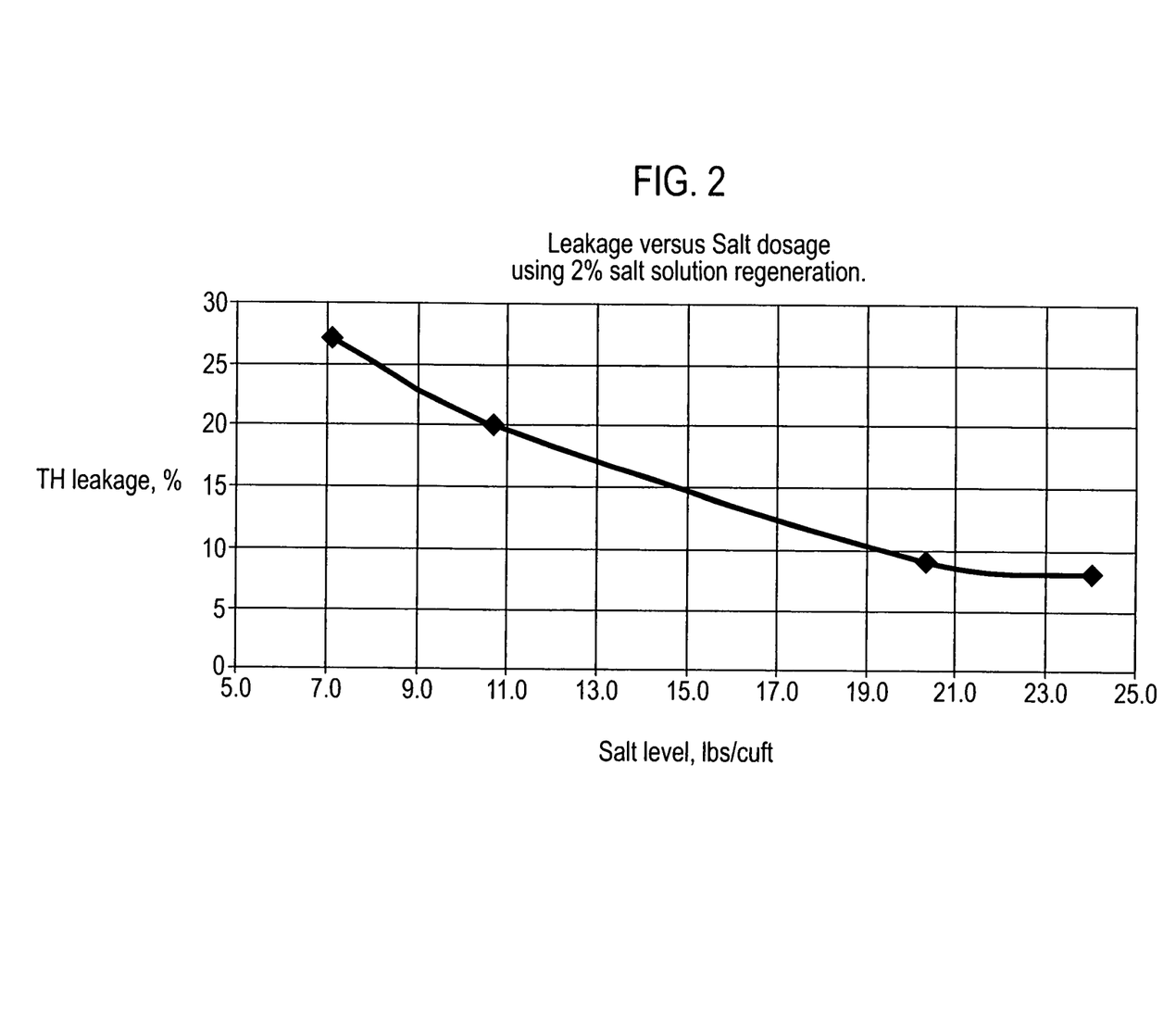

FIG. 2 shows the TH Leakage versus salt dosage using a 2% salt solution as the regenerating brine.

Figure 3:
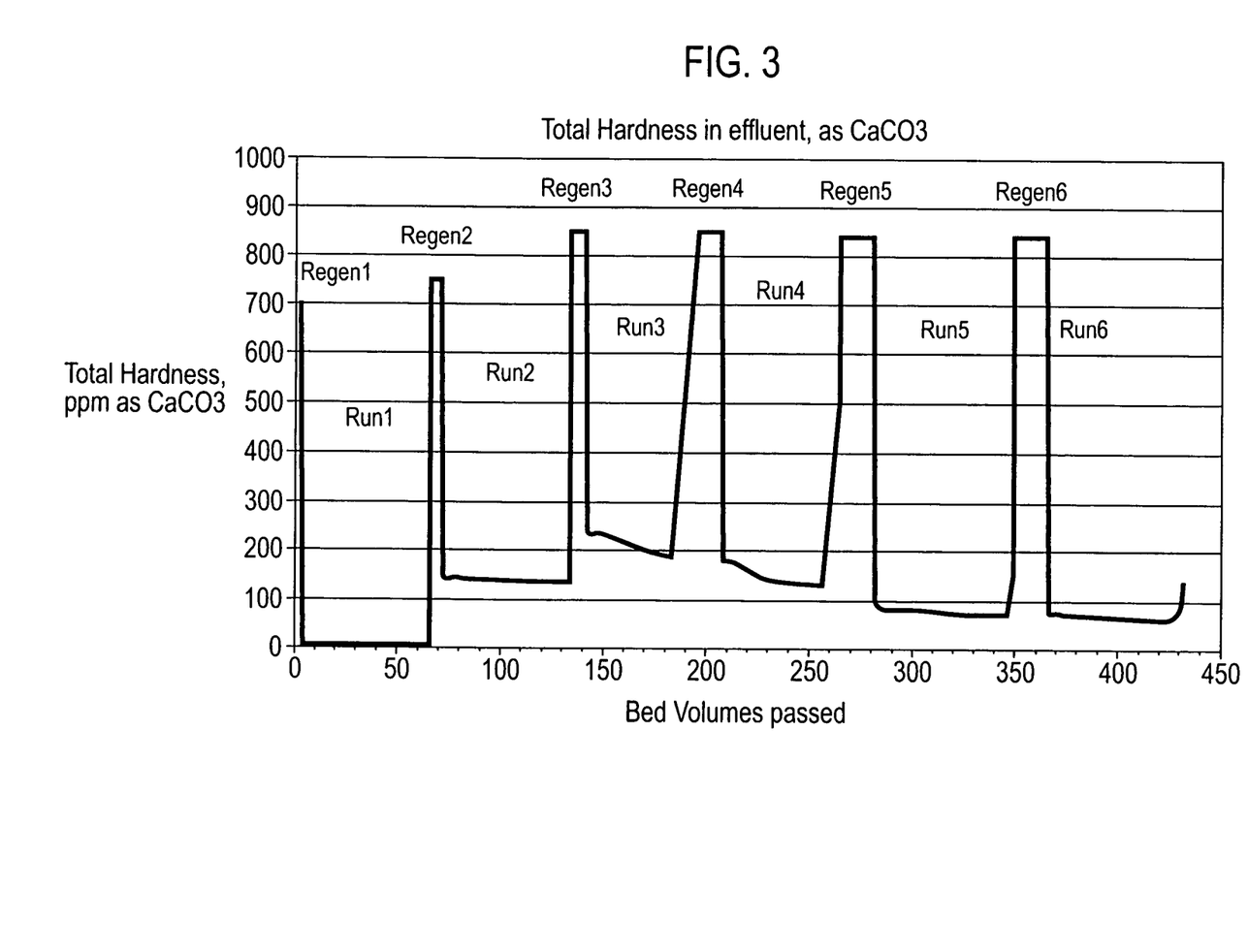

FIG. 3 shows the total hardness (ppmv as CaCO$_3$ equivalents) in the effluent from the column for Runs 1 to 6.

The invention claimed is:

1. A method for generating a softened injection water comprising:
   (A) generating the softened injection water by (i) introducing a source water having a total dissolved solids content of up to 15,000 mg/liter and having a multivalent cation content of greater than 40 mg/liter to a vessel that contains a bed of a cation exchange resin in its monovalent cation form, (ii) passing the source water through the cation exchange resin bed so that at least a portion of the multivalent cations in the source water are replaced by monovalent cations from the cation exchange resin, and (iii) withdrawing from the vessel the softened injection water having a multivalent cation content of up to 40 mg/liter;
   (B) regenerating the cation exchange resin by (i) introducing a regenerating brine to the vessel, (ii) passing the regenerating brine through the resin bed and (iii) withdrawing from the vessel a brine containing displaced multivalent cations, wherein the regenerating brine is a naturally occurring high salinity water having a concentration of monovalent cations and of multivalent cations such that the Softening Limit for the source water is up to 40 mg/liter of multivalent cations wherein the Softening Limit for the source water is defined as the Softening Ratio multiplied by the concentration of multivalent cations in the source water (mg/liter) and wherein the Softening Ratio is defined as:

(molar concentration of monovalent cations in the source water)$^2$/(molar concentration of multivalent cations in the source water):(molar concentration of monovalent cations in the regenerating brine)$^2$/(molar concentration of multivalent cations in the regenerating brine).

2. A method as claimed in claim 1 wherein the softened water is generated by introducing the source water into a plurality of vessels that are arranged in parallel wherein each of the vessels contains a bed of the cation exchange resin in its monovalent cation form and the source water is passed through the resin bed of each vessel thereby forming the softened injection water.

3. A method as claimed in claim 2 wherein the supply of the source water to at least one of the vessels is interrupted and the cation exchange resin that is contained in the vessel is regenerated by introducing the regenerating brine to the vessel, passing the regenerating brine through the resin bed and withdrawing from the vessel a brine containing displaced multivalent cations.

4. A method as claimed in claim 1 wherein the vessel has a diameter of from 1 to 4 meters and a height of from 2 to 5 meters and wherein the height of the resin bed in the vessel is from 0.5 to 3 meters.

5. A method as claimed in claim 1 wherein the regenerating brine is passed through the resin bed in the regeneration step in a direction counter-current to the flow of the source water in the softening step.

6. A method as claimed in claim 1 wherein the source water is selected from brackish water, aquifer water, connate water, fresh water, or produced water.

7. A method as claimed in claim 1 wherein the source water is filtered to remove particulate matter having a particle size of greater than 10 microns.

8. A method as claimed in claim 1 wherein the source water contains at least 60 ppmv of multivalent cations, preferably, at least 100 ppmv of multivalent cations.

9. A method as claimed in claim 1 wherein the Softening Limit (ppmv) for the source water is less than 30 ppmv, preferably, less than 25 ppmv of multivalent cations.

10. A method as claimed in claim 1 wherein the softened water has a multivalent cation content in the range 2 to 40 ppmv, preferably, 5 to 40 ppmv.

11. A method as claimed in claim 1 wherein the cation exchange resin is a macroreticular-type resin or gel-type resin.

12. A method as claimed in claim 1 wherein the cation exchange resin is a strong acid cation exchange resin comprising a polymeric matrix having sulfonic acid active groups that are capable of ionically bonding to Group IA metal cations and of exchanging the Group IA metal cations for multivalent cations in the source water.

13. A method as claimed in claim 1 wherein the cation exchange resin has a bead size in the range of 0.5 to 1 mm, preferably, 0.6 to 0.85 mm.

14. A method as claimed in claim 1 wherein the regenerating brine is obtained from an aquifer.

15. A method as claimed in claim 1 wherein the resin bed is exposed to 2 to 30 bed volumes, preferably, 5 to 20 bed volumes of the regenerating brine.

16. A method as claimed in claim 1 wherein the regenerating brine has a total dissolved solids content (TDS) of at least 10,000 ppmv, preferably, at least 15,000, more preferably, at least 17,500, in particular, at least 20,000 ppmv.

17. A method of increasing the recovery of crude oil from a reservoir comprising at least one porous and permeable subterranean formation wherein the formation comprises sandstone rock and at least one mineral that has a negative zeta potential under the reservoir conditions and wherein crude oil and connate water are present within the pores of the formation, the method comprising:
(A) generating a softened injection water having a multivalent cation content of up to 40 mg/liter by (i) introducing a source water having a total dissolved solids content of less than 15,000 mg/liter and having a multivalent cation content of greater than 40 mg/liter to a vessel that contains a bed of a cation exchange resin in its monovalent cation form so that at least a portion of the multivalent cations in the source water are replaced by monovalent cations from the cation exchange resin, (ii) passing the source water through the cation exchange resin bed, and (iii) withdrawing from the vessel the softened injection water;
(B) injecting the softened injection water formed in step (A) into the formation thereby displacing crude oil from the surface of the pores of the formation;
(C) regenerating the cation exchange resin by (i) introducing a regenerating brine to the vessel, (ii) passing the regenerating brine through the resin bed and (iii) withdrawing from the vessel a brine containing displaced multivalent cations, wherein the regenerating brine is a naturally occurring high salinity water having a concentration of monovalent cations and of multivalent cations such that the Softening Limit for the source water is less than 40 mg/liter of multivalent cations wherein the Softening Limit for the source water is defined as the ratio of $\{[\text{source water monovalent cation}]^2/[\text{source water multivalent cation}]\}$ (mol/mol) and $\{[\text{regenerating brine monovalent cation}]^2/[\text{regenerating brine multivalent cation}]\}$ (mol/mol) (hereinafter referred to as Softening Ratio) multiplied by the concentration of multivalent cations in the source water (mg/liter); and
(D) passing the brine containing the displaced multivalent cations that is withdrawn from the vessel in step (C) to a brine disposal means.

18. A method as claimed in claim 17 wherein the softened water is generated by introducing the source water into a plurality of vessels that are arranged in parallel wherein each of the vessels contains a bed of the cation exchange resin in its monovalent cation form and the source water is passed through the resin bed of each vessel thereby forming the softened injection water.

19. A method as claimed in claim 18 wherein the supply of the source water to at least one of the vessels is interrupted and the cation exchange resin that is contained in the vessel is regenerated by introducing the regenerating brine to the vessel, passing the regenerating brine through the resin bed and withdrawing from the vessel a brine containing displaced multivalent cations.

20. A method as claimed in claim 17 wherein the vessel has a diameter of from 1 to 4 meters and a height of from 2 to 5 meters and wherein the height of the resin bed in the vessel is from 0.5 to 3 meters.

21. A method as claimed in claim 17 wherein the regenerating brine is passed through the resin bed in the regeneration step in a direction counter-current to the flow of the source water in the softening step.

22. A method as claimed in claim 17 wherein the source water is selected from brackish water, aquifer water, connate water, fresh water, or produced water.

23. A method as claimed in claim 17 wherein the source water is filtered to remove particulate matter having a particle size of greater than 10 microns.

24. A method as claimed in claim 17 wherein the source water has a total dissolved solids content (TDS) in the range of 8,000 to 15,000 ppmv, preferably, 8,000 to 12,000 ppmv, when the formation comprises a swelling clay.

25. A method as claimed in claim 17 wherein the source water has a total dissolved solids content (TDS) in the range of 500 to 10,000 ppmv, preferably 1,000 to 8,000 ppmv, for example, 1,000 to 5,000 ppmv, when the formation contains negligible amounts of a swelling clay.

26. A method as claimed in claim 17 wherein the source water contains at least 60 ppmv of multivalent cations, preferably, at least 100 ppmv of multivalent cations.

27. A method as claimed in claim 17 wherein the Softening Limit (ppmv) for the source water is less than 30 ppmv, preferably, less than 25 ppmv of multivalent cations.

28. A method as claimed in claim 17 wherein the softened water has a multivalent cation content in the range 2 to 40 ppmv, preferably, 5 to 40 ppmv.

29. A method as claimed in claim 17 wherein the cation exchange resin is a macroreticular-type resin or gel-type resin.

30. A method as claimed in claim 17 wherein the cation exchange resin is a strong acid cation exchange resin comprising a polymeric matrix having sulfonic acid active groups that are capable of ionically bonding to Group IA metal cations and of exchanging the Group IA metal cations for multivalent cations in the source water.

31. A method as claimed in claim 17 wherein the cation exchange resin has a bead size in the range of 0.5 to 1 mm, preferably, 0.6 to 0.85 mm.

32. A method as claimed in claim 17 wherein the regenerating brine is obtained from an aquifer.

33. A method as claimed in claim 17 wherein the resin bed is exposed to 2 to 30 bed volumes, preferably, 5 to 20 bed volumes of the regenerating brine.

34. A method as claimed in claim 17 wherein the regenerating brine has a total dissolved solids content (TDS) of at least 10,000 ppmv, preferably, at least 15,000, more preferably, at least 17,500, in particular, at least 20,000 ppmv.

35. A method a claimed in claim 17 wherein the brine disposal means is a disposal well that injects the brine into an aquifer that is hydraulically isolated from the hydrocarbon-bearing formation of the oil reservoir.

36. A method as claimed in claim 17 wherein the brine disposal means is a fluid stream selected from a produced water stream or a produced multiphase fluid stream and the brine that contains the displaced multivalent cations is diluted into the produced water stream or is diluted into the produced multiphase fluid stream.

37. A method as claimed in claim 17 wherein the ratio of the total multivalent cation content of the softened injection water to the total multivalent cation content of the connate water is less than 1, preferably less than 0.8, more preferably, less than 0.6, yet more preferably, less than 0.5, and especially less than 0.4 or less than 0.25.

38. A method as claimed in claim 17 wherein the softened injection water is injected into the formation in one or more portions having a pore volume, PV, in the range of 0.2 to 0.9, preferably 0.3 to 0.6, and especially 0.3 to 0.45 PV.

* * * * *